United States Patent
Hunt et al.

[11] 4,128,759
[45] Dec. 5, 1978

[54] FIBER OPTIC DELAY LINE FILTER

[75] Inventors: Barry R. Hunt; George M. Dillard; Henry F. Taylor, all of San Diego, Calif.

[73] Assignee: The United States of America as represented by the Secretary of the Navy, Washington, D.C.

[21] Appl. No.: 853,157

[22] Filed: Nov. 21, 1977

[51] Int. Cl.$^2$ ............................................. H04B 9/00
[52] U.S. Cl. ................................... 250/199; 358/901; 350/96.13
[58] Field of Search ................... 250/199; 358/901; 350/96.10, 96.13, 96.14

[56] References Cited

U.S. PATENT DOCUMENTS

| | | | |
|---|---|---|---|
| 2,451,465 | 10/1948 | Barney | 250/199 |
| 3,604,936 | 9/1971 | Kompfner | 250/199 |
| 3,619,620 | 11/1971 | Ring | 350/96.1 |
| 3,887,939 | 6/1975 | Hunt | 358/901 |
| 4,079,246 | 3/1978 | Misek | 250/199 |

Primary Examiner—Robert L. Richardson
Assistant Examiner—Edward L. Coles
Attorney, Agent, or Firm—R. S. Sciascia; G. J. Rubens; J. W. McLaren

[57] ABSTRACT

A fiber optic delay line filter receives light energy input signals representative of any form of temporally varying signals such as electrical or acoustical, for example. A plurality of fiber optic light paths each having a determinably variant optical propagation delay, receives and transmits the light energy signals. A photo responsive means receives the delayed output light energy signals transmitted by the plurality of fiber optic light paths and produces a single electrical output signal as a function of the sum of the delayed output light energy signals, thus performing a filtering or correlation function. In a preferred embodiment, an injection laser or light emitting diode may be employed as the means for converting the temporally varying input signals to commensurate light energy signals. In a variant embodiment, a single fiber optic light path, having a partially reflective surface at each end, gives effect to multiple reflective transmissions along the length of the fiber optic light path which are then detected by a photo responsive device, providing a narrowband filter output as a function of the length and number of multiple reflective transmissions.

14 Claims, 4 Drawing Figures

FIBER OPTIC DELAY LINE FILTER

BACKGROUND OF THE INVENTION

The general purpose of a delay line filter is to perform filtering operations on temporally varying input signals. Most commonly, such temporally varying input signals are electrical in character, though they may originate in acoustical or other forms as well.

One form of the delay line filter is the transversal filter which comprises a delay line having taps spaced at suitable intervals of determinable time delays. Signals derived from the various taps are added and the resultant sum provides the output of the filter. Weighting factors, as may be represented by signal attenuation, for example, are sometimes applied to the individual taps.

Accordingly, if the input signal is electrical in character comprising a time varying voltage $V_s(t)$, the voltage output of the filter $V_o(t)$ may be expressed as $$V_o(t) = \sum_{n=1}^{N} a_n V_s(t - \tau_n), \quad (1)$$

where the constants $a_n$ and $\tau_n$ represent the respective weighting factors, and time delays associated with the $n$'th tap, $n=1,2,\ldots,N$, and N is the total number of taps. In present practice, electrical coaxial cables and surface acoustic wave devices are among the types of delay lines most commonly used in transversal filters.

However, coaxial cables suffer from the disadvantages of large signal distortion and attenuation at high frequencies, above approximately 100 MHz, and therefore are of limited usefulness for time delays much greater than one microsecond at such frequencies.

Surface acoustic wave devices also suffer from the disadvantage of severe attenuation at frequencies greater than a few hundred MHz and the fabrication of transversal filter devices which operate at bandwidths of several hundred MHz is accordingly difficult. Moreover, unwanted acoustic reflections can significantly degrade the performance of surface acoustic wave devices if the number of taps employed in a particular device is large.

Accordingly, there is a need for a delay line filter which will function to perform the desired operations without the disadvantages of present day and prior art delay line filters employing electrical coaxial delay lines and surface acoustic wave devices, for example. It is a contemplation of the present invention that fiber optic delay lines can be employed to obviate many of the disadvantages of prior art delay line filters.

SUMMARY OF THE INVENTION

The present invention conceives converting a source of temporally varying signals which may be electronic, electrical, or acoustical in nature, for example, into commensurate light energy signals. The light energy signals thus produced are arranged to be transmitted along a plurality of fiber optic light paths which are characterized as having determinably variant optical propagation delays. Such variant optical propagation delays may be given effect in the plurality of fiber optic light paths by different physical length of the multiple fiber optic light paths, or by deliberately changing the propagation constants of the several fiber optic light paths causing a change of refractive index in response to an electro-optically responsive means proximate to one or more of the plurality of fiber optic light paths.

A photo responsive detection means is disposed to receive the delayed output light energy signals of all the plurality of fiber optic light paths for producing a single electrical output signal which is a function of the sum of the delayed output light energy signals and thereby performs the filtering function.

In one embodiment of the present invention, each of the fiber optic light paths may include an attenuator for independently determining the amplitude of the light signal transmitted by each of the plurality of fiber optic light paths, thereby weighting the signals transmitted by each light path as desired.

A variant embodiment of the present invention provides that a plurality of independent means such as antennae, for example, are responsive to an angularly received electromagnetic wavefront thereby developing temporally varying input signals which are then processed by being converted to commensurate light signals and in turn are transmitted along independent fiber optic light paths having determinably variant optical propagation delays.

Essentially in the manner previously described, photo detection means is disposed to receive the delayed output light energy signals of all the plurality of fiber optic light paths to produce a single electrical output signal which is a function of the sum of the delayed output light energy signals and completes the filtering function of the apparatus.

Another variant embodiment of the present invention involves a single fiber optic light path which receives a temporally varying input light signal for transmission along its length. The concept of the present invention, however, contemplates the addition of partially reflective means positioned at each end of the fiber optic light path for causing multiple, two-way, reflective transmissions of the light energy signals along the length of the fiber optic light path.

A suitable photo detection means is disposed to receive the multiple reflective transmission of the light energy signals for providing an electrical output containing only determinable narrowband frequencies of the input light energy signals as a function of the length and number of the multiple reflective transmissions within the fiber optic light path. Thus, this particular embodiment of the present invention functions in the manner of a narrowband fiber optic delay line filter.

A further modification of the narrowband fiber optic delay line filter described hereinbefore contemplates the inclusion of a means for changing the propagation constant of the fiber optic light path so that the bandpass of the narrowband fiber optic delay line filtering function may be tuned as desired. Such a suitable means for changing the propagation constant of the fiber optic light path may comprise a material which is electro-optically responsive to an electrical signal imposed thereon so as to cause commensurate optical changes in refractive index, for instance, which in turn cause a change in the propagation constant of the fiber optic light path.

Thus, it may be appreciated by those knowledgeable and skilled in the pertinent arts that the concept of the present invention embraces several variant embodiments all of which perform fiber optic delay line filtering functions, but produce different desirable specific results in response to the variant conditions and parameters imposed upon the basic structure of each fiber optic delay line filter embodiment.

OBJECTS OF THE PRESENT INVENTION

Accordingly, it is a primary object of the present invention to provide delay line filtering functions for the analysis and correlation of temporally varying input signals without the inherent disadvantages of prior art concepts performing comparable operations.

Yet another important object of the present invention is to provide such a delay line filter which will avail of the advantage of fiber optic transmission of light energy signals.

A further object of the present invention is to provide a fiber optic delay filter which is capable of performing varying functions in accordance with modifications employed in its variant embodiments.

Another object of the present invention is to provide such a fiber optic delay line filter which is capable of performing in the manner of a transversal filter.

Yet another object of the present invention is to provide a fiber optic delay line filter which obviates the frequency limitations inherent in electrical type filters designed to perform comparable functions.

Another object of the present invention is to avail of the advantages of fiber optic elements and techniques to provide delay lines which are capable of larger time delays than electrical coaxial cables or surface effect wave delay lines as employed in the prior art.

A further object of the present invention is to provide the advantages of fiber optic delay lines which can offer many closely spaced taps without introducing significant signal reflection problems.

Another object of the present invention is to avail of the advantages of fiber optics in delay line configurations which are small, lightweight, and virtually immune to radio frequency interference, as well as being less sensitive to ambient temperature changes.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

The present invention contemplates a fiber optic delay line filter which consists of a plurality of fiber optic light paths of different optical lengths, or having different propagation delays. The multiple fiber optic light paths are arranged to receive input light energy signals at one end for transmission along their length and coupling of the emergent light energy signals into a photo responsive means at the other end. The output of each fiber optic light path therefore corresponds to one delay line tap and is analogous to the delay line tap as employed in electrical, electronic, and surface acoustic delay line techniques of the prior art.

Individual fiber optic light paths may also be provided with independently operative attenuators for weighting the amplitude of the light energy signals transmitted and produced at each optical delay line path output. The photo responsive means sums the output light energy signals from all the fiber optic paths simultaneously and the electrical output signal from the photo responsive means such as a suitable filter detector, for example, is preferably passed through a highpass electronic filter to remove the dc component of the photo current. Therefore, the remaining ac component of the photo current is the electrical output of the fiber optics delay line filter.

The optical power output of $P_s(t)$ of an injection light source, such as an injection laser or an light emitting diode, is modulated as a function of the amplitude of a signal voltage $V_s(t)$, i.e., a temporally varying input signal, according to the relationship $$P_s(t) = KV_s(t) + P_o \qquad (2)$$

where K and $P_o$ are constants, and the modulating voltage is assumed to affect the optical output power in a linear fashion. The cw component of optical power, $P_o$, is necessary to compensate for the unipolar nature of the optical power, since $P_s(t) \geq 0$.

The detected power may then be expressed as $$P_d(t) = P_o \sum_{n=1}^{N} \sigma_n + K \sum_{n=1}^{N} \sigma_n V_s(t - \tau_n), \qquad (3)$$

where the $\tau_n$'s are the propagation delays for the fibers and the $\sigma_n$'s are the adjustable transmission factors. These are chosen such that $\sigma_n = K^1 a_n$, where $a_n$ is the weighting factor associated with the n'th fiber and $K^1$ is a constant.

With these parameters then the detected power is $$P_d(t) = P_o \sum_{n=1}^{N} \sigma_n + KK^1 V_o(t) \qquad (4)$$

with $V_o(t)$ given by (1). Thus, the time-varying portion of $Pd(t)$ is proportional to the output of the fiber optic delay line filter performing transversal filter functions with delays $[\tau_n]$ and weighting factors $[a_n]$.

Several different types of filters for use in signal processing can be implemented through the advantageous use of fiber optic delay lines within the concept of the present invention. These include narrowband filters, temporal matched filters, and phase-matched filters as well as transversal filters.

Figure 1:
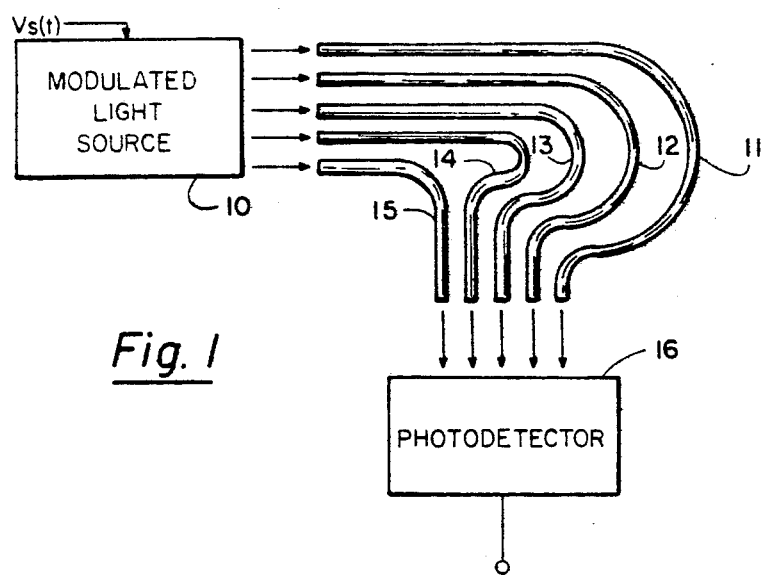
FIG. 1 is a schematic representation of one embodiment of the present invention.

In the embodiment illustrated in FIG. 1, a transducer means such as an injection laser or light emitting diode 10 converts temporally varying input signals to commensurate light energy signals.

The light energy signals are received and transmitted by all of the plurality of fiber optic light paths 11, 12, 13, 14, and 15. A single photo responsive means 16 receives the delayed transmitted light energy signals for producing a single electrical output signal as a function of the sum of the delayed output light energy signals, thus performing the filtering function in a manner well-known in the overall filter arts, including the prior art electronic techniques.

When an embodiment of the present invention such as illustrated in FIG. 1 is made to provide variant optical propagation delays differing by equal increments between the plurality of fiber optic light paths 11, 12, 13, 14, and 15, a narrowband fiber optic delay line filter operation is obtained. In that particular embodiment $$V_o(t) \alpha \sum_{n=1}^{N} V_s(t - (n-1)\Delta\tau) \qquad (5)$$

where $\Delta\tau$ is the intertap delay. If N is large, the amplitude of $V_o$ will be sharply peaked for signal frequencies $\nu_j = j\nu_o, j = 1, 2, 3, \ldots$, where $\nu_o = 1/\Delta\tau$.

By passing the output $V_o(t)$ through a low pass or broadband filter having a center frequency $\nu_j$ at a passband less than 2 $\nu_o$, a narrowband filter with center frequency $\nu_j$ and spectral $\Delta\nu$ width of the order of $\nu_o/N$ is obtained.

Figure 2:
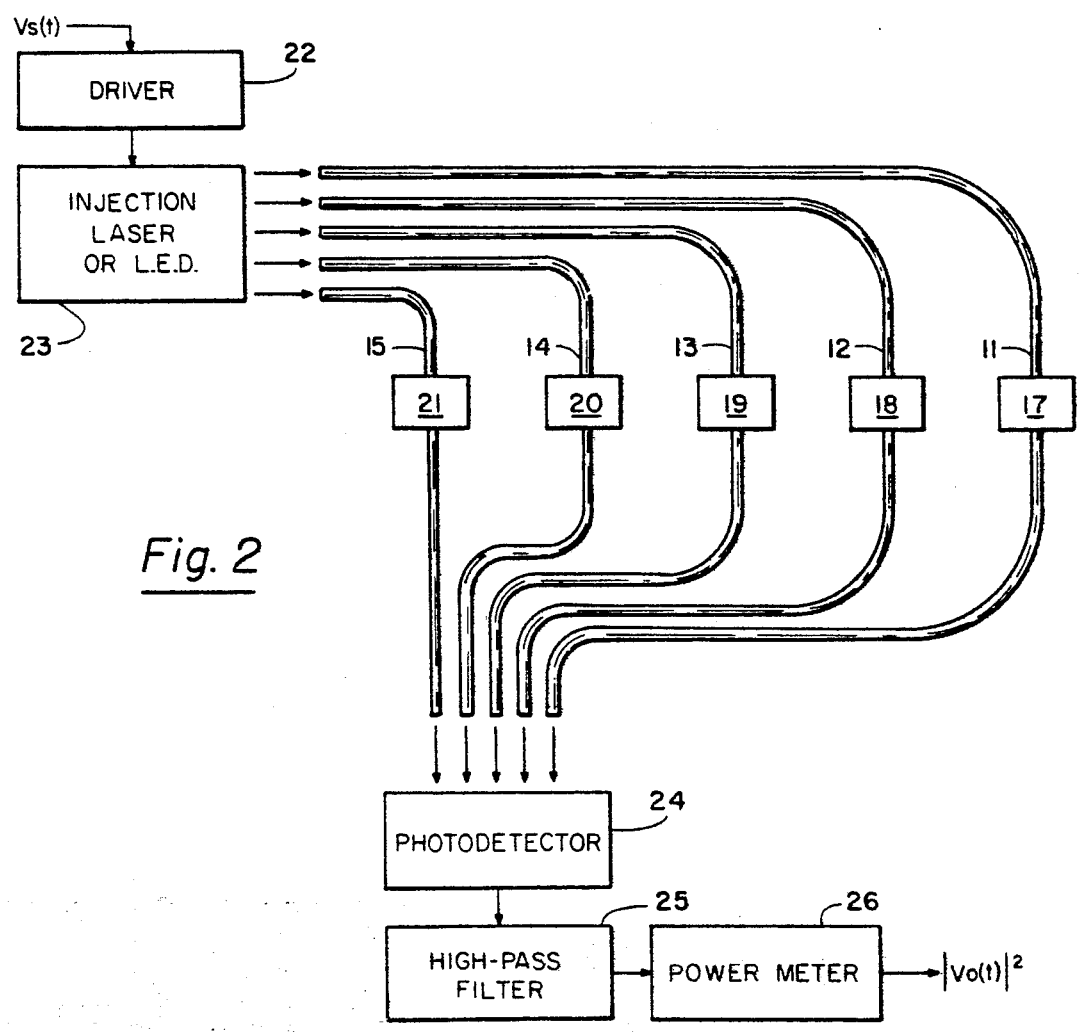
FIG. 2 is a schematic representation of a variant embodiment of the present invention which functions essentially in the manner of a transversal filter.

FIG. 2 illustrates a variant embodiment of the present invention wherein like elements bear the same numerical designation as FIG. 1. However, the embodiment of FIG. 2 includes independently operative attenuators 17, 18, 19, 20, and 21 which function to selectively vary the amplitude of the light energy signals propagated along each of the fiber optic delay lines 11, 12, 13, 14, and 15, respectively. Such attenuation provides a weighting affect as was discussed previously in connection with the relationships expressed by Equation (4) supra.

In the embodiment of FIG. 2 the temporally varying input signal $V_s(t)$ is suitably amplified in a driver 22 and converted to commensurate light energy signals by a transducer 23. After transmission along the predeterminedly weighted fiber optic light paths 11, 12, 13, 14, and 15, the resultant light energy signals are received at a photo responsive means 24 which functions to sum and to convert the received signals, producing the filter signals.

A high-pass filter 25 removes the dc component of the photo-current generated by the light energy signals and a suitable meter 26 or equivalent instrumentation indicates the filter output $|V_o(t)|^2$.

Figure 3:
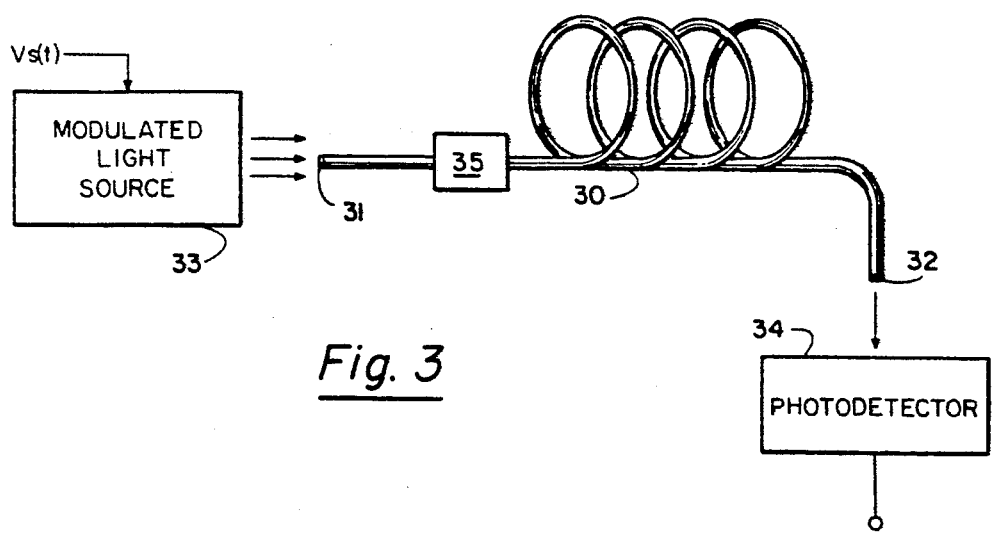
FIG. 3 is a schematic representation of a variant embodiment of the present invention which functions essentially in the manner of a narrowband filter.

FIG. 3 illustrates a variant embodiment of the present invention which functions in the manner of a narrowband fiber optic delay line filter employing a single fiber optic light path 30 with partially reflective means such as appropriate coatings 31 and 32 supported on opposite ends of the fiber optic light path for causing multiple reflections. In a manner similar to that previously described in connection with the description of the embodiments of FIGS. 1 and 2, the narrowband fiber optic delay filter illustrated in FIG. 3 employs a suitable means such as an injection laser or a light emitting diode 33 for converting temporally varying input signals to commensurate light energy signals.

Thus, the light energy signals are transmitted along the fiber optic delay line 30 by being partially transmitted through the partially reflecting reflective means 31, along the length of a fiber optic light path 30 to its opposite end, where the light energy signals are again partially reflected by the partially reflective means 32 at the other end of the fiber optic light path 30. Multiple reflections are caused to occur and the resultant output light energy signals received at a photo responsive means 34 produce an electrical output signal containing only determinable narrowband frequencies of the input signals which is a function of the length and number of the multiple reflective transmissions.

In a further variation of the embodiment illustrated in FIG. 3, means 35 for changing the propagation constant of the fiber optic light path 30 may be included for providing a tuning affect for the bandpass of the narrowband filter function performed as described. Such means for changing the propagation constant of the fiber optic delay 30 may consist of a suitable electro-optic responsive material which impresses a change of refractive index on the fiber optic light path, thus affecting the propagation constant to tune the narrowband filtering frequency as desired.

The narrowband fiber optic delay line filter as illustrated in FIG. 3 with a single fiber optic light path and partially reflecting ends, operates so that $\nu_o = 1/T$, where T is the round trip propagation delay in the fiber optic light path 30 and $\Delta\nu \sim \nu_o(1-\nu_1\nu_2)$, where $\nu_1$ and $\nu_2$ are the reflectances of the two ends of the fiber optic light path.

Figure 4:
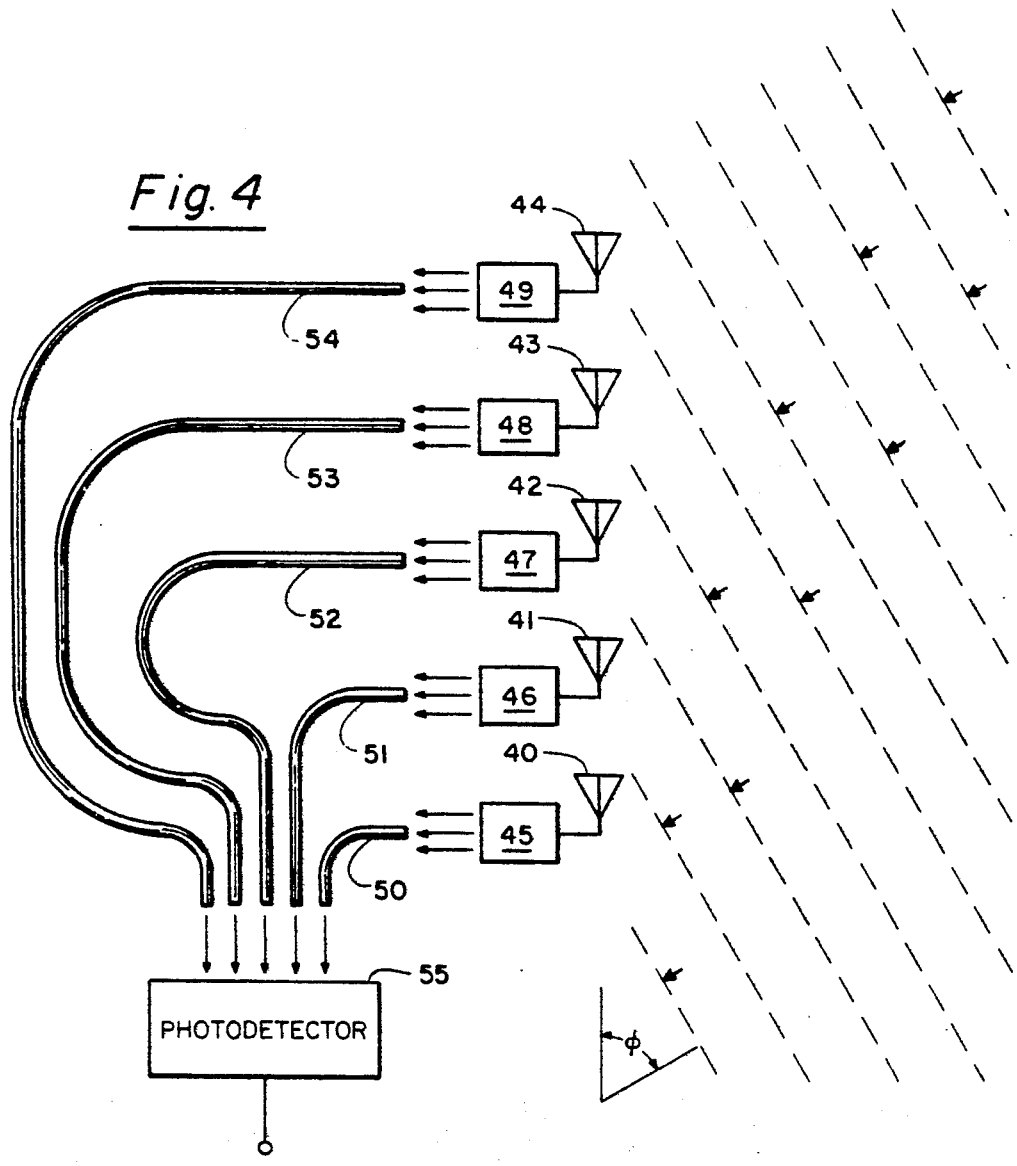
FIG. 4 is a schematic representation of a further variant embodiment of the present invention which functions essentially in a manner of a delay match filter for determining the angle of arrival of an incoming radio frequency signal.

The fiber optic delay line of the present invention may also assume a configuration in which the temporally varying input signals are developed by a plurality of independent means such as antennae which are responsive to an angularly received electromagnetic wavefront. In that configuration, as illustrated in FIG. 4, the independently operative antennae 40, 41, 42, 43, and 44, each are responsive for developing an input signal upon reception of a common incident wavefront (as represented by the dash lines) received at angle $\theta$. As will be readily appreciated, however, the signals are separated in time as a function of the angle $\theta$.

The respective signals thus developed by the antennae 40 through 44 are converted to commensurate light energy signals by transducers 45, 46, 47, 48, and 49, respectively. The resultant temporally varying light energy signals are then transmitted over the plurality of fiber optic light paths 50, 51, 52, 53, and 54 which are characterized as having known variant optical propagation delays represented by different physical lengths in the illustration of FIG. 4.

A common photo detection means 55 receives the delayed output light energy signals from the plurality of fiber optic light paths 45 through 49 and produces a single output signal as a function of the sum of the delayed output light energy signals. Accordingly, the embodiment of FIG. 4 functions in the manner of a phase matched filter producing an output indicative of the incident angle $\theta$ as related to the axis of the linear array of antennae 40 through 44.

If an electromagnetic wavefront as represented by the dash lines in FIG. 4 is incident at the angle $\theta$ relative to the axis of the linear array of antennae 40 through 44, the time delay $\tau_n$ between array element $n$ and $n+1$, is $\tau_n(\theta) = (l_n - l_{n+1}) \cos\theta/c$, where $l_n$ and $l_{n+1}$ refer to the positions of adjacent antennae, and c is the velocity of light. The antennae signals will be denoted by $V_{sn}(t)$. These can be summed coherently by transmitting the $n$'th signal through a delay of length $\tau_n(\theta_o)$ so that $$V_o(t,\theta) = \sum_{n=1}^{N} V_{sn}[t - \tau_n(\theta_o)] \qquad (6)$$

As $\theta$ varies, the filter output will have a peak for $\theta = \theta_o$. Separate filters designed for peak response at different angles $\theta_o(j), j=1, \ldots, M$, can be provided to give an accurate indication of the arrival angle of one signal or to simultaneously monitor signals arriving at different angles.

Those skilled and knowledgeable in the pertinent arts will appreciate that the concept of the present invention employing fiber optic delay lines to achieve filtering functions can be extended and adapted to a number of different types and kinds of filtering techniques.

Additionally, the use of fiber optic delay lines makes it possible to operate at higher signal frequencies and employ larger time delays than were possible with electrical, coaxial, or surface affect wave delay lines which were employed in the prior art techniques.

Furthermore, many closely spaced taps may be provided in fiber optic delay lines without introducing signal reflection problems as was frequently encountered in many prior art filtering techniques.

Desirably, the employment of fiber optic delay line light paths has the advantages that the fiber optic light paths are small, light in weight, immune to radio frequency interference, and less sensitive to ambient temperature changes than other known types of delay lines conventionally used in the prior art.

The concept of the present invention also affords the use of new and improved optical sources and photo responsive detectors which are ideally adapted to an inherent feature of the present invention which conceives the use of the single photo detection means to sum the signals from a number of different independent fiber optic delay lines.

Variant equivalent alternatives may be implemented within the concept of the present invention such as providing multiple taps by coupling light out of one or more fiber optical light paths at several points along their length with all of the light energy signals thus collected at the various taps being coupled into and received by a single photo responsive means for producing a single electrical output signal as a function of the received multiply delayed light energy signals.

Obviously many other modifications and variations of the present invention are possible in the light of the above teachings. It is therefore to be understood that within the scope of the appended claims the invention may be practiced otherwise than as specifically described.

What is claimed is:

1. A fiber optic delay line filter comprising:
   transducer means for converting temporally varying input signals to commensurate light energy signals;
   a plurality of fiber optic light paths arranged to receive and transmit said light energy signals,
   said fiber optic light paths having determinably variant optical propagation delays; and
   a photo detection means disposed to receive the delayed output light energy signals of all said plurality of fiber optic light paths for producing a single electrical output signal as a function of the sum of said delayed output light energy signals.

2. A fiber optic delay line filter as claimed in claim 1 wherein said fiber optic light paths are of different physical lengths to provide said different optical propagation delays.

3. A fiber optic delay line filter as claimed in claim 1 wherein each of said fiber optic light paths includes an attenuator for independently determining the amplitude of the optical signal transmitted by each of the fiber optic light paths.

4. A fiber optic delay line filter as claimed in claim 3 including means for selectively varying the degree of attenuation provided by each attenuator.

5. A fiber optic delay line filter as claimed in claim 1 wherein said fiber optic light paths provide a plurality of variant optical propagation delays differing by equal increments.

6. A fiber optic delay line filter as claimed in claim 1 including a plurality of independent means responsive to an angularly received electromagnetic wavefront for developing said temporally varying input signals.

7. A fiber optic delay line filter as claimed in claim 1 wherein said temporally varying input signals are electrical in character.

8. A fiber optic delay line filter as claimed in claim 1 wherein said transducer means comprises an injection laser.

9. A fiber optic delay line filter as claimed in claim 1 wherein said transducer means comprises a light emitting diode.

10. A narrowband fiber optic delay line filter comprising:
    transducer means for converting temporally varying input signals to commensurate light energy signals;
    a fiber optic light path arranged to receive and transmit said light energy signals;
    a partially reflective surface at each end of said fiber optic light path for causing multiple reflective transmissions of said light energy signals along the length of said fiber optic light path; and
    a photo detection means disposed to receive the multiple reflective transmissions of said light energy signals for providing an electrical output containing only determinable narrowband frequencies of said input signals as a function of the length and number of said multiple reflective transmissions.

11. A narrowband fiber optic delay line filter as claimed in claim 10 wherein the partially reflective surface at each end of said fiber optic light path comprises a partially reflective coating supported on the fiber optic end.

12. A narrowband fiber optic delay line filter as claimed in claim 10 wherein said temporally varying input signals are electrical in character.

13. A narrowband fiber optic delay line filter as claimed in claim 10 and including means for changing the propagation constant of said fiber optic light path for tuning the bandpass of said filter.

14. A narrowband fiber optic delay line filter as claimed in claim 13 wherein said means for changing the propagation constant of said fiber optic light path is electro-optically responsive.

* * * * *